July 24, 1951 — R. L. PAWSAT — 2,561,710
STEERING FORK

Filed Nov. 2, 1948 — 2 Sheets-Sheet 1

INVENTOR.
RUBEN L. PAWSAT
BY Zugelter & Zugelter
Attys.

July 24, 1951 R. L. PAWSAT 2,561,710
STEERING FORK
Filed Nov. 2, 1948 2 Sheets-Sheet 2

INVENTOR.
RUBEN L. PAWSAT
BY Zugelter & Zugelter
Attys.

Patented July 24, 1951

2,561,710

UNITED STATES PATENT OFFICE 2,561,710

STEERING FORK

Ruben L. Pawsat, Maysville, Ky.

Application November 2, 1948, Serial No. 57,897

5 Claims. (Cl. 280—279)

This invention relates to steering assemblies for bicycles and the like and more particularly relates to a connection or joint between a steering post or stem and a steering fork.

An object of this invention is to provide a firm connection between a tubular post and a steering fork.

A further object of this invention is to provide a strong, reinforced connection between a post and a fork constructed of sheet metal.

A further object of this invention is to provide a reinforced lower end for the post or stem of a steering fork.

A further object of this invention is to provide means for attaching a mud guard or the like to a steering fork of this type without weakening the connection between the post and the fork.

A further object of this invention is to provide a connection between a tubular post and a fork in which an integral collar at the center of the fork is rolled or swaged about a groove in the post to hold the post and fork firmly together.

The above and other objects are attained by the means described herein and disclosed in the accompanying drawings, in which.

Throughout the drawings and specification, like numbers indicate like parts.

Figures 1, 2, 3:
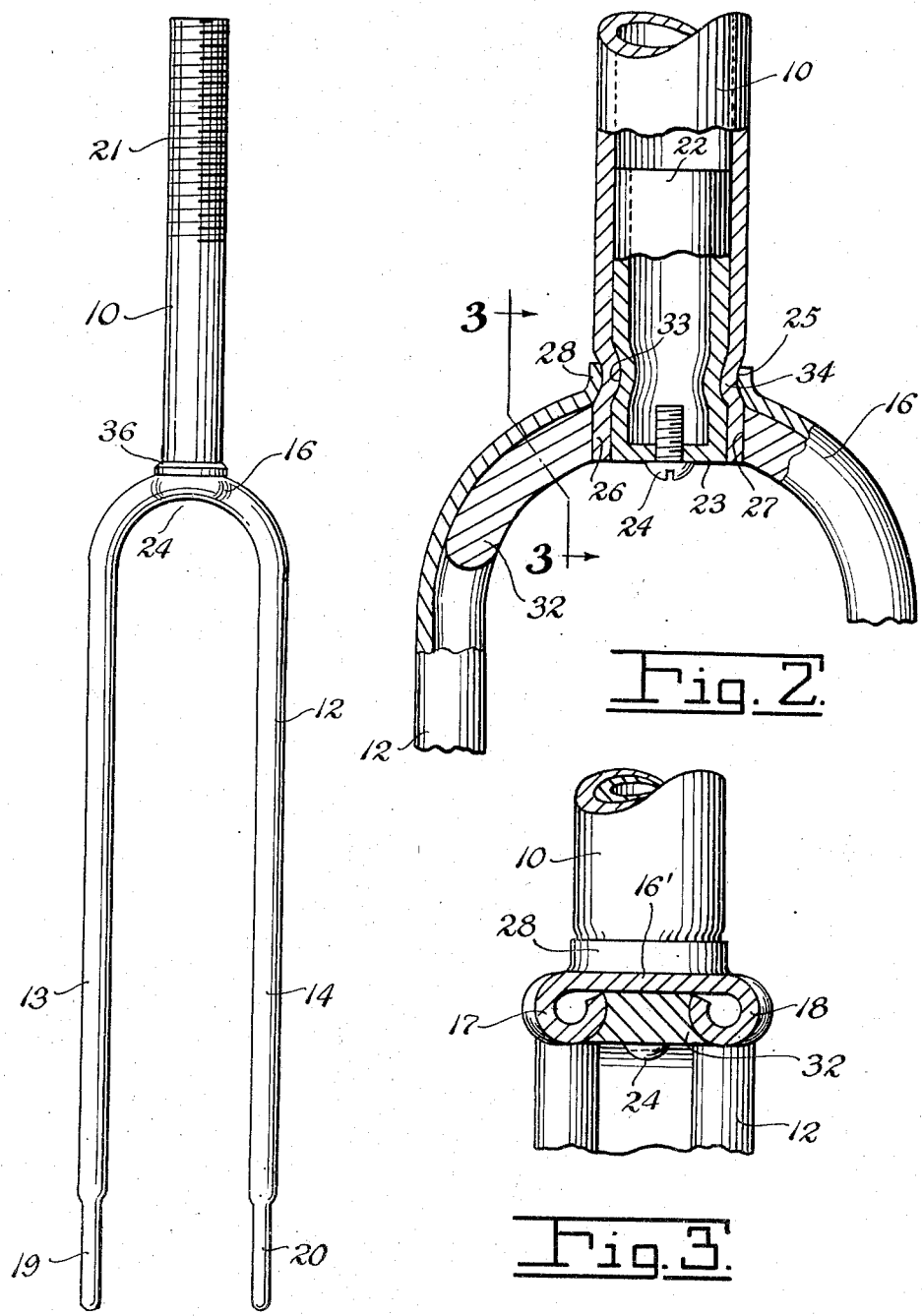
Fig. 1 is a front elevational view of a steering fork and post joined by a connection constructed in accordance with an embodiment of this invention.
Fig. 2 is an enlarged fragmentary front elevational view, partly broken away and in section, of the connection between the post and the lower section of the fork shown in Fig. 1.
Fig. 3 is a sectional view along a line 3—3 in Fig. 2.

In the embodiment shown in Figs. 1–4 inclusive, this invention provides a steering fork having a tubular post or stem 10 and a U-shaped fork 12 having legs 13 and 14 (Fig. 1) and a central portion or crown 16. The fork may be constructed of sheet metal having a central panel 16' and opposite lengthwise edges rolled to form beads 17 and 18 (Fig. 3). At lower ends of legs 13 and 14 are located axle supports 19 and 20, respectively (Fig. 1), which may be of conventional form and are constructed to receive an axle of a bicycle. The beads and lower portion of the fork may be of the type disclosed in the application of Ewald F. Pawsat and Ruben L. Pawsat, Serial No. 42,764, filed August 6, 1948, now Patent No. 2,532,034, granted November 28, 1950.

The post 10 is formed of hollow resilient pipe or tubing and is provided with threads 21 at its upper end by which the post may be connected to other portions of a bicycle. A short inner tube 22 having a closed lower end 23 fits inside the lower portion of post 10 and serves to reinforce the lower end of the post where the post is joined to the sheet metal fork. In addition, lower end 23 of the inner tube may be tapped and threaded to receive a screw 24 at the center of the steering fork for supporting a mud guard or the like. As shown in Fig. 2, the lower end of the inner tube may be substantially in alignment with the lower end of the post.

A circumferential groove 25 is formed in the outer wall of post 10 close to but spaced above the lower end of the post. A lower tip 26 of the post projects below groove 25.

An opening 27 and an integral upstanding collar 28 co-axial with opening 27 are formed at the center of panel 16' or of the crown of the fork. In forming the collar 28, concave surfaces 29 (Fig. 4), are formed in the beads 17 and 18 only one of which is shown, which surfaces are on opposite sides of opening 27 and conform to the contour of the lower end of post 10. The collar 28 and surfaces 29 form a socket for receiving the lower end of post 10.

When assembling post 10 and fork 12, the lower end of the post is inserted into the socket formed by collar 28 and surfaces 29, after which the collar 28 is rolled or swaged into groove 25 to make a firm non-slipping joint or connection. The metal of the post is resilient and, being hollow, can yield sufficiently to permit collar 28 to be rolled into groove 25. For further strengthening the crown of the fork between beads 17 and 18 may be filled with weld metal 32 about tip 26. The weld metal not only serves to hold the post firmly in place but also strengthens the crown portion 16 of fork 12.

Screw 24, as pointed out above, is supported by lower end 23 of the inner tube. The screw may serve to support a mud guard or the like, and screw 24 is supported at the center of the steering fork without any weakening of the connection between the post and the fork.

Inner tube 22 is held in place inside post 10 by a circumferential groove 33 in its outer surface into which the bead 34 in the outer tube is rolled or swaged. As will be understood, the grooves in the stem and in the inner tube may both be formed in a single operation which serves not only to form the grooves but also attaches the inner tube firmly in the stem.

The customary bearing ring 36 fits over and covers collar 28 and groove 25, as shown in Fig. 1.

Figures 4, 5:
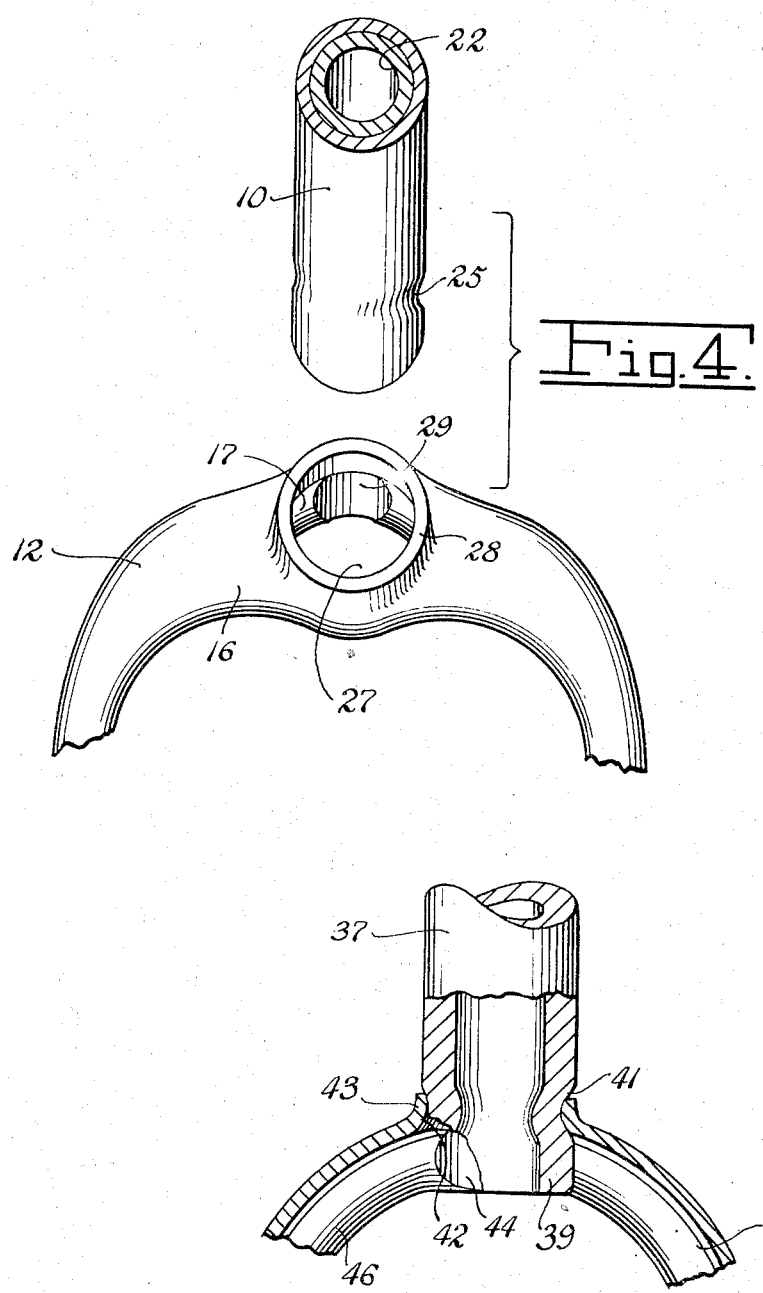
Fig. 4 is a fragmentary exploded view showing the lower end of the stem and the central portion of the lower section of the steering fork illustrated in Fig. 1 prior to assembly.
Fig. 5 is a front elevational view partly broken away and in section showing a steering assembly having a steering post and steering fork joined by a connection constructed in accordance with a second embodiment of this invention.

In Fig. 5 is shown a steering post and fork assembly in which a post 37 and a fork 38 are joined by a connection constructed in accordance with a second embodiment of this invention. Post 37 is formed of metal sufficiently thick that it does not require strengthening at a lower end 39 where it is joined to the fork. A circumferential groove 41 is formed in the outer surface of the post adjacent to but spaced from lower end 39.

Fork 38 may be of the same construction as the fork shown in Figs. 1-4 inclusive and includes an opening 42 and an integral collar 43 about opening 42. Concave surfaces 44, only one of which is shown, are formed in beads 46, the beads being formed along lengthwise edges of the fork.

Lower end 39 of post 37 fits into the socket formed by opennig 43 and surfaces 44, and collar 43 fits into groove 41 and is swaged or rolled to fit tightly in the groove to hold post 37 and fork 38 firmly in assembled relation.

In the embodiment illustrated in Fig. 5, the post is sufficiently thick that it does not require internal strengthening. Moreover, no weld metal is employed about the lower tip of the post, and the post is held in place by firm contact between the collar and the groove.

As will be understood, the embodiments of the invention shown admit of modification without departing either from the spirt or the scope of the invention as set forth in the appended claims.

Having described my invention what I claim as novel and desire to secure by Letters Patent is:

1. In a steering assembly of the class described, the combination of a tubular post having circumferential groove adjacent to and spaced from its lower end, the lowermost tip of the post extending below said circumferential groove, a one-piece bifurcated sheet metal fork, said fork having a central opening in its crown, and an integral collar surrounding said opennig and extending upwardly from said crown, opposite lengthwise edges of said fork being rolled to form lengthwise strengthening beads, the beads being spaced on opposite sides of said opening, said collar fitting in the circumferential groove, the lower tip of the post fitting between the opposite beads of the fork, said collar being deformed into the groove in said post to hold the post and the fork firmly in assembled relation.

2. In a steering assembly of the class described, the combination of a tubular post having a circumferential groove adjacent to and spaced from its lower end, the lowermost tip of the post extending below said circumferential groove, a one-piece bifurcated sheet metal fork, said fork having a central opening in its crown, an integral collar surrounding said opening and extending upwardly from said crown, opposite lengthwise edges of said fork being rolled to form lengthwise strengthening beads, the beads being spaced on opposite sides of said opening, said collar fitting in the circumferential groove, the lower tip of the post fitting between the opposite beads of the fork, said collar being deformed into the groove in said post to hold the post and the fork firmly in assembled relation, and a short inner tube fitting inside the lower end of the post, the lower end of the tube being closed by a flat plate extending perpendicularly to the axis of the tube, the closed end of the inner tube being substantially flush with the lower end of the post and holding the walls of the lower end of the post in engagement with the beads.

3. In a steering assembly of the class described, the combination of a tubular post having a circumferential groove adjacent to and spaced from its lower end, the lowermost tip of the post extending below said circumferential groove, a one-piece bifurcated sheet metal fork, said fork having a central opening in its crown, an integral collar surrounding said opening and extending upwardly from said crown, opposite lengthwise edges of said fork being rolled to form lengthwise strengthening beads, the beads being spaced on opposite sides of said opening, said collar fitting in the circumferential groove, the lower tip of the post fitting between the opposite beads of the fork, said collar being deformed into the groove in said post to hold said post and the fork firmly in assembled relation, and a short inner tube having a closed lower end fitting inside the lower end of the post with the closed end of the inner tube substantially flush with the lower end of the post, the inner tube having a circumferential groove in its outer surface, the post having an internal bead opposite the groove of the post which is deformed into the groove on the inner tube, whereby the inner tube and post are firmly held in assembled relationship.

4. In a steering assembly of the class described, the combination of a tubular post having a circumferential groove on its outer surface adjacent to and spaced from its lower end and an inner bead opposite the circumferential groove of the post, a one-piece bifurcated sheet metal fork, said fork having a central opening in its crown and an integral collar surrounding said opening and extending upwardly from said crown, opposite lengthwise edges of said fork being rolled to form lengthwise strengthening beads, said beads being spaced on opposite sides of said opening, the upper edge of said collar being deformed into the circumferential groove of the post, the lower tip of the post fitting between opposite beads of the fork, weld metal between the beads of the fork filling the crown of the fork about the lower tip of the post, and a short inner tube having a closed lower end substantially flush with the lower end of the post, the inner tube having a circumferential groove into which the inner bead of the post is deformed to hold the inner tube and the post in assembled relation.

5. In a steering assembly of the class described, the combination of a tubular post having an external circumferential groove adjacent the lower end thereof and a one-piece bifurcated sheet metal fork, said fork having a central opening in its crown and a tubular flange integral with the crown and extending upwardly therefrom in coaxial relation to the opening in the crown, the opposite vertical edges of said fork being curved inwardly against the legs of the fork to stiffen and strengthen the same, said curved edges being disposed on opposite sides of said opening, said flange extending into the groove of the post to hold the post and the fork firmly in assembled relation, the lower end of the post firmly engaging the opposite edges of the fork.

RUBEN L. PAWSAT.

REFERENCES CITED

The following references are of record in the file of this patent:

UNITED STATES PATENTS

| Number | Name | Date |
|---|---|---|
| 1,322,250 | Lewis | Nov. 18, 1919 |
| 1,883,033 | Snell | Oct. 18, 1932 |
| 2,010,173 | Anderson | Aug. 6, 1935 |
| 2,160,039 | Singer | May 30, 1939 |

FOREIGN PATENTS

| Number | Country | Date |
|---|---|---|
| 24,013 | Great Britain | 1896 |